US010013699B1

(12) United States Patent
Pope et al.

(10) Patent No.: US 10,013,699 B1
(45) Date of Patent: Jul. 3, 2018

(54) REVERSE ASSOCIATE WEBSITE DISCOVERY

(75) Inventors: Elmore Eugene Pope, Sammamish, WA (US); Srikanth Thirumalai, Clyde Hill, WA (US)

(73) Assignee: Amazon Technologies, Inc., Reno, NV (US)

(*) Notice: Subject to any disclaimer, the term of this patent is extended or adjusted under 35 U.S.C. 154(b) by 796 days.

(21) Appl. No.: 13/170,043

(22) Filed: Jun. 27, 2011

(51) Int. Cl.
*G06Q 30/00* (2012.01)
*G06Q 30/02* (2012.01)

(52) U.S. Cl.
CPC ..... *G06Q 30/0214* (2013.01); *G06Q 30/0211* (2013.01)

(58) Field of Classification Search
CPC ............. G06Q 30/0214; G06Q 30/0211
USPC ................................. 705/14.16, 14.13
See application file for complete search history.

(56) References Cited

U.S. PATENT DOCUMENTS

| 6,029,141 | A  | * | 2/2000  | Bezos et al. ............... 705/27.1 |
|-----------|----|---|---------|--------------------------------------|
| 7,720,721 | B1 | * | 5/2010  | Goldstein et al. .......... 705/26.1 |
| 8,271,878 | B2 | * | 9/2012  | Kane et al. ................ 715/733 |
| 2008/0270234 | A1 | * | 10/2008 | Flake et al. ................ 705/14 |
| 2008/0270426 | A1 | * | 10/2008 | Flake et al. ............... 707/100 |
| 2009/0222317 | A1 | * | 9/2009  | Allen et al. ................ 705/10 |
| 2010/0076949 | A1 | * | 3/2010  | Zoeter et al. .............. 707/706 |
| 2011/0040604 | A1 | * | 2/2011  | Kaib et al. .................. 705/10 |
| 2012/0030015 | A1 | * | 2/2012  | Brunsman et al. ....... 705/14.49 |

* cited by examiner

*Primary Examiner* — Matthew T Sittner
*Assistant Examiner* — Azam A Ansari
(74) *Attorney, Agent, or Firm* — Lee & Hayes, PLLC

(57) ABSTRACT

Extracting content from an associate website may enable a host website to gain insight into web content that are effective at driving consumers to the host website. The content extraction may involve selecting an associate website from multiple associate websites for content extraction, with the associate website including a referral link to an item for sale on the host merchant website. Content may be obtained from one or more web pages of the associate website, and at least a part of the content may be associated with the item that is listed for sale on the host website.

29 Claims, 9 Drawing Sheets

REVERSE ASSOCIATE WEBSITE DISCOVERY

BACKGROUND

A merchant that markets products online may, in addition to using its own website to sell products, rely on associate websites that refer consumers to its website. For example, an associate website may include a hyperlink to a particular product that is listed for sale on the website of the merchant. In turn, the merchant may provide the owner of the associate website with a commission for each consumer that is referred to the website of the merchant or a commission for each sale on the website of the merchant that resulted from a consumer referred by the associate website. However, while the use of the associate website as a marketing strategy may increase the sales revenues of the merchant, the merchant may nevertheless have limited information regarding the reason certain items featured on its website sell better than other similar items. While competitive price often dictate the number of sales of a certain item, other metrics that are not directly visible to the merchant may also have influenced the purchase decisions of consumers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
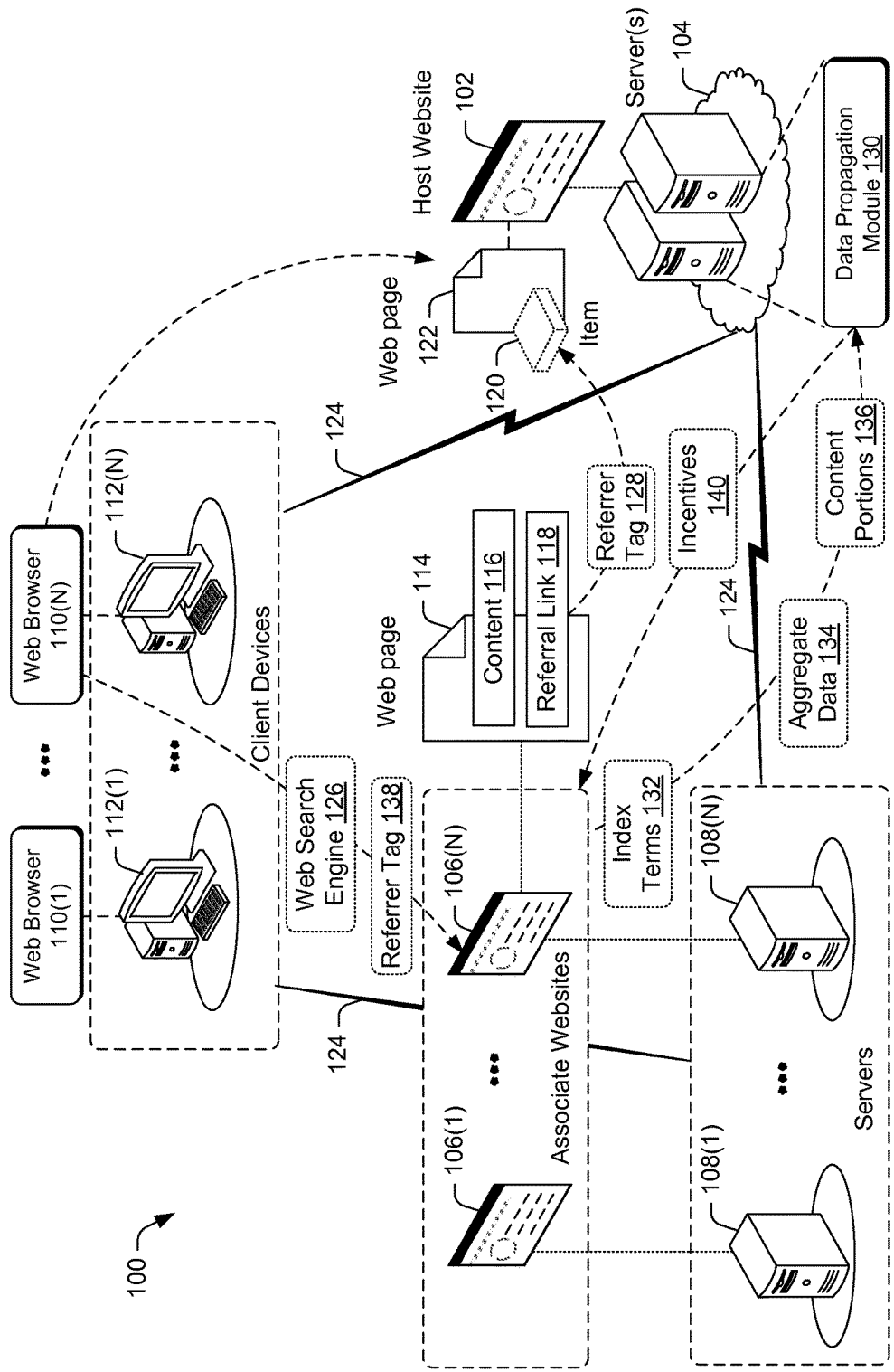
FIG. 1 shows an illustrative computing environment for implementing one or more embodiments of reverse associate website data discovery.

This disclosure is directed, in part, to techniques for an operator of a host merchant website to extract content from associate websites that are able to effectively drive consumer traffic or sales to the host merchant website. The associate websites are operated by website creators who refer consumers to the host merchant website by embedding hyperlinks to particular items that are for sale on the host merchant website on their associate websites. In turn, the website creators of the associate website may earn a commission from the operator of the host merchant website for each consumer referred to the host merchant website and/or a sale that results from each consumer referral.

In many instances, the website creators of the associate websites may place content on the web pages that contain these embedded hyperlinks, in which the content may market, critique, or otherwise provide additional information related to the items mentioned in the hyperlinks. For example, an associate website may contain editorial reviews for several different bicycles, in which each review contains a hyperlink to a corresponding bicycle that is for sale on the host merchant website. Thus, by extracting such content from the associate websites that are the most successful at driving consumer traffic or sales to the host website, the operator of the host website may acquire proven marketing tools in the form of index terms, aggregated information, and/or content portions from these associate websites. The operator of the host merchant website may then use such content on the host merchant website to increase the number of direct sales on the host merchant website.

For example, the operator of the host merchant website may associate a web page of a particular item that is for sale on the host merchant website with one or more index terms extracted from an associate website that has been particularly effective at driving viewing or sales of the particular item. In this way, when a consumer performs a search query using one of the index terms via a web search engine, a web page on the host merchant website listing the particular item may be returned as a search result. In this way, the return of the particular item as a search result may enable the host merchant website to leverage a correlation between the particular item and the index terms extracted from the associate website.

In another example, the techniques described herein may enable the operator of the host merchant website to aggregate content (e.g., editorial reviews) from multiple associate websites for a particular item that is for sale on the host merchant website. The operator may further associate the aggregated content with the particular item so that a search query that matches a word, phrase, or sentence in the aggregated content may return the particular item as a query result.

In an additional example, the techniques described herein may enable the operator of the host merchant website to import entire content portions (e.g., editorial reviews) from one or more associate websites for presentation on the host merchant website. Thus, a consumer viewing the imported content portions on the host merchant website may be driven to make the same purchasing decision regarding a particular item in the same manner as if the consumer is viewing one of the associate websites.

By leveraging data extracted from associate websites, the operator of the host merchant website may gain valuable insight into web content that is particularly effective in driving consumer purchases of different items. Further, the use of such web content may provide the operator of the host merchant website with a marketing edge over competitors with similar merchant websites.

In various embodiments, the content extraction may involve selecting an associate website from multiple associate websites for content extraction, with each of the associate websites including a referral link to an item offered for consumption (e.g., for purchase, rental, leasing, viewing, etc.) on the host merchant website. Content may be obtained from one or more web pages of the associate website, and at least a part of the content may be associated with the item that is listed on the host website.

Illustrative System Architecture

FIG. 1 shows an illustrative computing environment 100 for implementing one or more embodiments of reverse associate website data discovery. The environment 100 may include a host merchant website 102 that is implemented by one or more servers 104, associate websites 106(1)-106(N) that are hosted on servers 108(1)-108(N), and web browsers 110(1)-110(N) that are implemented on client devices 112(1)-112(N).

Consumers may use the web browsers 110(1)-110(N) on the client devices 112(1)-112(N) to purchase products from the host merchant website 102 that is hosted on one or more servers 104. Each of the client devices 112(1)-112(N) may be an electronic device that is capable of receiving, processing, storing, and transmitting data to another device. In various embodiments, each of the client devices 112(1)-112(N) may be any one of a laptop computer, a desktop computer, a tablet computer, a game console, or another electronic device that is equipped with network communication components, data processing components, and at least one electronic display for displaying data.

The one or more servers 104 may implement the host merchant website 102. The one or more server 104 may be located in a single data center, or across multiple data centers that are a part of a computing cloud. Moreover, the data centers may be located at a single geographical location, or across multiple geographical locations around the globe.

In some instances, consumers may be referred to the host merchant website 102 by associate websites 106(1)-106(N) that are hosted on servers 108(1)-108(N). For example, the associate website 106(1) may be hosted a server 108(1), and the associate website 106(N) may be hosted on the server 108(N). Each of the associate websites 106(1)-106(N) may include one or more referral links (hyperlinks) to items that are for sale on the host merchant website 102. The referral links of each associate website may be placed with other content on one or more web pages that make up the corresponding website. For example, the associate website 106(N) may include a web page 114 that contains content 116 and a referral link 118 to an item 120 that is listed for sale on a web page 122 of the host merchant website 102. In various embodiments, contents of the associate websites, such as the content 116, may include text object, image objects, media objects, such as audiovisual objects, and/or so forth.

The one or more servers 104, the servers 108(1)-108(N), and the client devices 112(1)-112(N) may be linked by a network 124. The network 124 may be a local area network ("LAN"), a larger network such as a wide area network ("WAN"), or a collection of networks, such as the Internet. Protocols for network communication, such as TCP/IP, may be used to implement the network 124.

Thus, a consumer that is using the web browser 110(1) may view or purchase an item, such as the item 120, by navigating directly to a web page that contains the item on the host merchant website 102. For example, the consumer may wish to purchase a particular brand and model of television set may use the web browser 110(1) to navigate directly to the host merchant website 102. Once at the host merchant website 102, the consumer may use a site search engine or a menu on the host merchant website 102 to locate a web page that lists the particular television. After viewing the details on the web page, the consumer may make a purchasing decision regarding the particular television.

Alternatively, the consumer may use the web browser 110(1) to navigate to the associate website 106(N), and then use the referral link 118 to navigate to the web page on the host merchant website 102 that lists the item. In turn, the host merchant website 102 may determine the identity of the associate website 106(N) via the referrer tag 128 embedded in the referral link 118, and the host merchant website 102 may provide a commission to an operator of the associate website 106(N) for the consumer referral. For example, the associate website 106(N) may be a website that provides editorial reviews of the latest television sets. Accordingly, a consumer may type a search query (e.g., television set reviews) into a web search engine 126 using the web browser 110(N). In turn, the web search engine 126 may provide the associate website 106(N) as one of the top query results. After navigating to the associate website 106(N), the consumer may read a review that indicates a particular television as a top performer. The review may also include a referral link to the particular television for sale on the host merchant website 102. The consumer may then click on the referral link to view and/or purchase the particular television on the host merchant website 102.

In various embodiments, the operator of the host merchant website 102 may use a data propagation engine 130 to extract data from the contents of selected associate websites of the associate websites 106(1)-106(N). The data propagation module 130 may select one or more associate website from the associate websites 106(1)-106(N) based at least on the ability of content on each associate website to generate consumer traffic and/or sales for the host merchant website 102. Once an associate website is selected, the data propagation engine 130 may use a corresponding referrer tag, such as the referrer tag 128, to navigate to the associate website and extract data. For example, the referrer tag may include associate website identifying information, such as a uniform resource location (URL) and/or an assigned associate website identifier that can be correlated to a URL by the data propagation engine 130. The data propagation engine 130 may be implemented on the one or more servers 104.

In such embodiments, the data propagation engine 130 may extract index terms 132, aggregate data 134, and/or content portions 136 from one or more web pages of each selected associate website. For example, data propagation engine 130 may extract index terms from the web page 114 that includes the referral link 118. In another example, the data propagation engine 130 may locate and aggregate content (e.g., editorial reviews) from web pages of multiple selected associate websites. In another example, the data propagation engine 130 may import content (e.g., portions of text objects) from a web page of a selected associate website, such as from the web page 114.

In some additional embodiments, the data propagation engine 130 may further cause an associate website to provide a secondary referrer tag of an additional referrer link that a consumer who ultimately visited or purchased an item at the host merchant website 102 used to navigate to the associate website. The additional referral link may include information related to how the consumer navigated to the associate website prior to using a referral link on the associate website to navigate to a web page on the host merchant website 102. Such information may include the URL of the website the consumer was referred from to an associate website. The information may further include text data, such as search terms or key word terms that may also be beneficial to the host merchant website 102 as index term 132. For example, the associate website 106(N) may further provide a secondary referrer tag 138 to the host merchant website 102 that indicates that the consumer used the web search engine 126 to discover and navigated to the associate website 106(N).

The data propagation engine 130 may further use the extracted data from the various selected associate websites to increase the appeal of the host merchant website 102 to consumers. In some instance, the data propagation engine 130 may associate a web page on the host merchant website 102 that lists a particular item with the index terms extracted from web pages of one or more websites that contains referral links to the particular item. For example, the data propagation engine 130 may associate the web page 122 with the index terms extracted from the web page 114 of the associate website 106(N). In this way, a web search engine, such as the web search engine 126, may index the web page 122 in the same manner as the web page 114, so that a consumer who is interested in viewing the web page 114 of the associate website 106(N) may also be directed to the web page 122 by the search engine. Accordingly, the opportunity to view the web page 122 may in some cases induce the consumer to directly purchase the item 120 shown on the web page 122 without first visiting the web page 114 of the associate website 106(N).

In other instances, the data propagation engine 130 may present the aggregate data 134 and/or the content portions 136 on additional web pages of the host merchant website 102. The additional web pages may be searchable via both a web search engine (e.g., the web search engine 126) and a site search engine of the host merchant website 102. Is this way, a consumer that is interested in the content (e.g., editorial reviews) of the selected associate websites may have the opportunity to also view the content directly at the host merchant website 102. Accordingly, such opportunities may enable consumers to conveniently view contents of multiple associate websites at one location, as well as efficiently make a desired purchase directly at the host merchant website 102 without performing additional browser navigation.

In some embodiments, the operator of the host merchant website 102 may provide incentives 140 to the selected associate websites for sharing their content with the host merchant website 102. Such incentives 140 may include monetary compensation for content usage, increased commission on consumer referred through referral links, or statistical data on the effectiveness of the content of each associate website in attracting consumer purchase at the host merchant website 102.

Illustrative System Components

Figure 2:
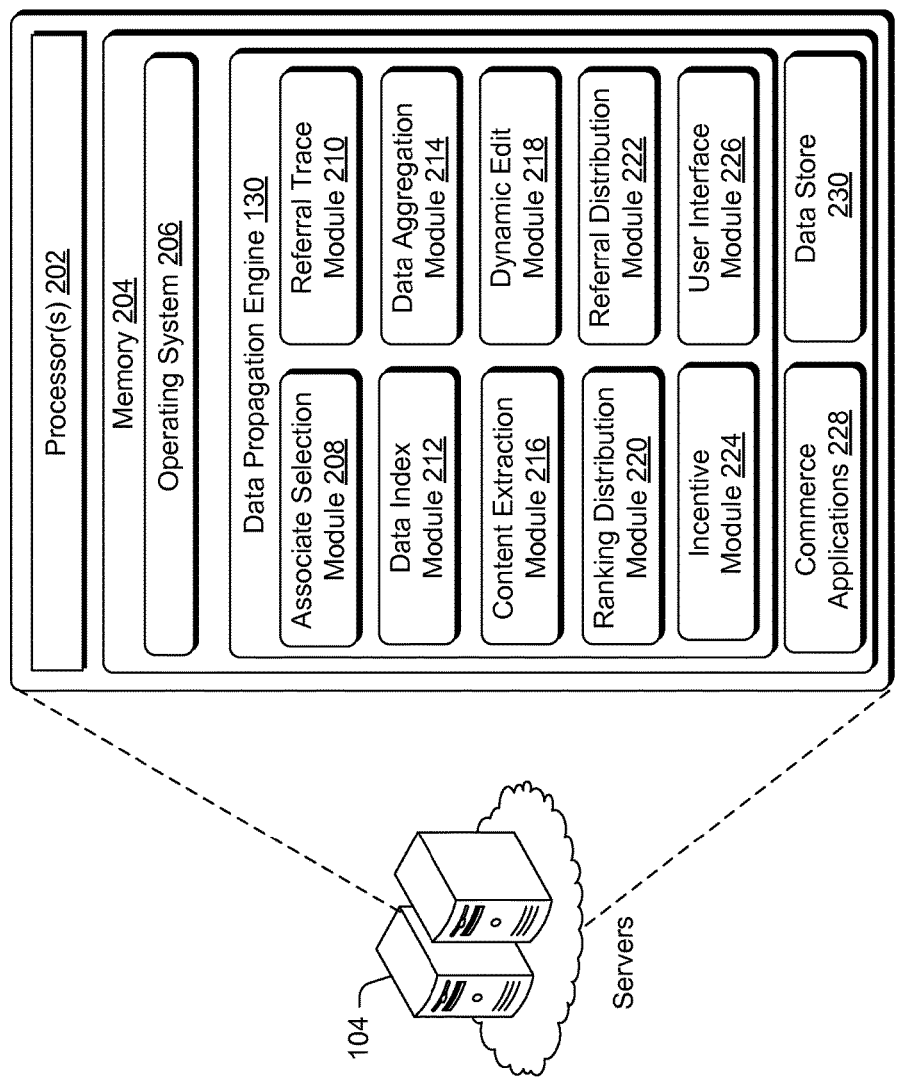
FIG. 2 shows illustrative components in an example data propagation engine that performs the reverse associate website data discovery.

FIG. 2 shows illustrative components in the data propagation engine 130 that performs the reverse associate website data discovery. The data propagation engine 130 may be implemented the one or more servers 104. The servers 104 may include processor(s) 202 and memory 204. An operating system 206 may be stored in the memory 204. The operating system 206 may include components that enable the servers 104 to receive data via various inputs (e.g., user controls, network interfaces, and/or memory devices) and process the data using the processors 202 to generate output. The operating system 206 may further include one or more components that present the output (e.g., display an image on an electronic display, store data in memory, transmit data to another electronic device, etc.). Additionally, the operating system 206 may include other components that perform various other functions generally associated with an operating system.

The data propagation engine 130 may include an associate selection module 208, a referral trace module 210, a data index module 212, a data aggregation module 214, a content extraction module 216, a dynamic edit module 218, a ranking distribution module 220, a referral distribution module 222, an incentive module 224, and a user interface module 226. The modules may include routines, programs instructions, objects, and/or data structures that perform particular tasks or implement particular abstract data types. The servers 104 may further implement commerce applications 228 and a data store 230.

The associate selection module 208 may select associate websites 106(1)-106(N) for data extraction based on various metrics. These metrics may reflect the ability of the content on each associate website to benefit the host merchant website 102. The metrics may include the number of sale conversions that each associate website is able to bring to the host merchant website 102 through one or more referral links in a predetermined time period. The metrics may also include the number of visits that each of the associate websites 106(1)-106(N) is able to bring to the host merchant website 102 through one or more referral links in a predetermined time period. The metrics may additional include a sale conversion rate of each of the associate website 106(1)-106(N) in the predetermined time period. The sale conversion rate may measure the number of sale conversions per a number of visits generated for the host merchant website 102 in a predefined period of time. The metrics may further include information on the reputation of each associate website, and/or other metrics. For example, the reputation of an associate website may depend on its ability to provide accurate and up-to-date data related to various products, unbiased and truthful opinions, and/or commentary that reflect actual experience or first account information. As further described below, the associate selection module 208 may take into account consumer provided reputation ratings for different associate websites.

The metrics may also include other factors that quantify the effectiveness of each associate website in generating sales for the host merchant website 102 against corresponding benchmark values. In some embodiments, the metrics may include sale conversion rates of the associate websites 106(1)-106(N), in which a difference between the sale conversion rate of each associate website and a benchmark sale conversion rate indicates the effectiveness of each associate website. The benchmark sale conversion rate may be the sale conversion rate for another sales generation technique, such as a sale conversion rate that result from visit traffic that comes directly to the host merchant website 102, or a particular external search of content entirely generated by the operator of the host merchant website 102. Other examples of the benchmark conversion rate may include sale conversion rates that result from an email advertising campaign implemented by the host merchant website 102, a coupon-based marketing campaign implemented by the host merchant website 102, and so forth. Thus, the greater the difference between the sale conversion rate of an associate website of the associate websites 106(1)-106(N) and the benchmark sale conversion rate, the more likely that the content of the associate website is beneficial to the host merchant website 102.

In additional embodiments, the metrics may include the total sales values generated by the associate websites 106(1)-106(N) for one or more items for sale on the host merchant website 102. The difference between a total sales value generated by an associate website and a benchmark sales value in a predefined period of time may indicate the effectiveness of the associate website. In such embodiments, the benchmark value may be any previously attained or projected sales value, such as the value of the sales the one or more items achieved entirely by the host merchant website 102, the value of the sales of the one or more items achieved by a competitor merchant website, an expected sales value for the one or more items, and so forth. Thus, the greater the difference between the sales value generated by an associate website of the associate websites 106(1)-106(N) and the benchmark sales value for the predefined period of time, the more likely that the content of the associate website is beneficial to the host merchant website 102. In additional embodiments, benchmark values for the number of sale conversions or the number of visits generated for a predetermined time period may also be established to select one or more associate websites for data extraction.

The associate selection module 208 may analyze the one or more metrics on each associate website of the associate websites 106(1)-106(N) to form a ranking of the associate websites, and then select a number of these associate websites for data extraction. In some embodiments, the associate selection module 208 may perform a ranking in which associate websites that generated sales at the host merchant website 102 in a predetermined time period are ranked higher than those associate websites that generated visitor traffic. Further, those associate websites that generated visitor traffic at the host merchant website 102 in the predetermined time period are ranked higher than those that did not generate visitor traffic. Additionally, an associate website that generated a higher number of sale conversions is ranked higher than an associate website that generated a lower number of sale conversions. Likewise, an associate website that generated a higher number of visits to the host merchant website 102 is ranked higher than an associate website that generated a lower number of visitors. Following such ranking, the associate selection module 208 may select a predetermined quantity of associate websites (e.g., predetermined number or percentage of associate websites) that are ranked the highest in sale conversion and/or visitor generation for data extraction.

The associate selection module 208 may also rank the associate websites 106(1)-106(N) based on other values that quantify the effectiveness of the associate websites in generating sales for the host merchant website 102 and corresponding benchmark values. For example, the associate selection module 208 may rank the associate websites according to the differences in their respective sale conversion rates/numbers to a benchmark sale conversation rate/number (e.g., higher sale conversion rate difference results in higher ranking). The associate selection module 208 may also rank the associate websites 106(1)-106(N) in a similar manner using a benchmark visit generation number and the visit generation number of each associate website. Likewise, the associate selection module 208 may also rank the associate websites 106(1)-106(N) or according to the difference in their respective total sales values for one or more items to a benchmark sales value for the one or more items (e.g., higher value difference results in higher ranking) In this way, the associate selection module 208 may select a predetermined quantity of associate websites (e.g., predetermined number or percentage of associate websites) that are ranked the highest according to a particular benchmark for data extraction.

In other embodiments, the associate selection module 208 may take into account multiple metrics by deriving a total ranking score for each associate website based on at least several metrics. For example, the associate selection module 208 may assign points to each of the associate websites 106(1)-106(N) that rates each associate website in the sale conversion category for a predetermined time period. For example, given that three associate websites respectively generated 100 sales, 90 sales, and 60 sales for the host merchant website 102 in a predetermined time period, the three associate websites may be given 100 points, 90 points, and 60 points, respectively. The associate selection module 208 may further assign points to each of the associate websites 106(1)-106(N) that rates each associate website in the visit generation category for a predetermined time period. In such an example, given that three associate websites respectively generated 100 visits, 80 visitors, and 40 visits to the host merchant website 102, the three associate website may be given 100 points, 80 pints, and 40 points, respectively.

The associate selection module 208 may additionally assign points to each of the associate websites 106(1)-106(N) that rates each associate website in the reputation category for a predetermined time period. For example, given that three associate websites respectively have an average reputation rating of 5 stars, 3 stars, and 1 star, the three associate websites may be given 5 points, 3 points, and 1 point, respectively.

In some embodiments, the associate selection module 208 may further weigh the points each associate website received in each category. For example, when the operator of the host merchant website 102 determines that sale conversion is twice as important as visit generation, the associate selection module 208 may be configured to assign a weight factor of "2" to the points that each associate website received in the sale conversion category, while the points that each associate website received in the visit generation category may be assigned a weight factor of "1". Further, the operator may also assign a weight factor (e.g., 20) to the reputation points of each associate website to normalize such points with the sale conversion and visit generation points.

In this way, the associate selection module 208 may generate a total score for each associate website by adding up the points each associate website received in each category. For example, an associate website having a weighted sale conversion score of 180, a weighted visit generation score of 100, and a weighted reputation score of 100 may receive a total ranking score of 380. Subsequently, the associate selection module 208 may select a predetermined quantity of associate websites (e.g., predetermined number or percentage of associate websites) that with the highest ranking scores for data extraction. However, it will be appreciated that the associate selection module 208 may be configured differently in other embodiments with respect to ranking each associate website according to respective metrics. For example, the associate selection module 208 may use a different number of categories, additional categories, different weighting factors, unweighed points, and/or so forth.

In still other embodiments, the associate selection module 208 may forego the relative comparison of the associate websites 106(1)-106(N) to each other. In some implementations, the associate selection module 208 may select an associate website for data extraction when the ranking score of the associate website exceeds a predefined ranking score threshold. For example, in the weighted score scenario described above, the associate selection module 208 may select an associate website for data extraction when the weighted score of the associate website exceeds a value of 250. Accordingly, the associate selection module 208 may evaluate each of the associate websites 106(1)-106(N) based on a predefined ranking score threshold to select one or more associate websites for data extraction.

In other implementations, the associate selection module 208 may select an associate website from the associate websites 106(1)-106(N) for data extraction when a value that quantifies the effective of the associate website in generating sales for the host merchant website 102 exceeds a corresponding beach mark value. For example, the associate selection module 208 may select one or more associate websites from the associate websites 106(1)-106(N) based on a corresponding sale conversion rate or a corresponding total sales value of each associate website. For example, an associate website may be selected for content extraction when its sale conversion rate exceeds a benchmark sale conversion rate, or when its sale conversion rate exceeds the benchmark sale conversion rate by some predefined difference amount or percentage.

In another example, an associate website may be selected for content extraction when its total sales value exceeds a benchmark sales value, or when its total sales value exceeds the benchmark sales value by some predefined difference amount or percentage. In additional examples, benchmark values for the numbers of sale conversions or visits generated for a predetermined time period may be established for the applicable sale generation techniques described above, and the associate selection module 208 may select an associate website for content extraction when the number of sale conversions or the number of visits the associate website generated for the predetermined time period exceeds the corresponding benchmark value.

In further embodiments, the associate selection module 208 may use a machine recognition algorithm to exclude associate websites that are demand aggregation websites from being selected. A demand aggregation website may be a website that is established for the purpose of fund raising. The demand aggregation website may motivate individuals that share a common interest to use referral links on the demand aggregation website to visit or make purchase on the host merchant website 102. In this way, the demand aggregation website may generate revenue by earning commission on the visitor traffic or sale conversions that the demand aggregation website generates on the host merchant website 102. For example, an interest group may set up an associate website that is a demand aggregation website to raise money for a particular cause, and then encourage members of the interest group to earn commission for the group by using the referral links on the associate website to visit or make purchases of items on the host merchant website 102.

The machine learning algorithm may detect sales or visitation patterns that indicate that a particular associate website is a demand aggregation website. In some embodiments, the machine learning algorithm may perform such detection by examining the correlation between the identities of the associate websites embedded in received referrer tags, such as the referrer tag 128, and the web pages of the host merchant websites 102 being visited or at which sales occurred. For example, the visits or sales on the host merchant website 102 referred from a demand aggregation website may be scattered across a wide variety of items or item categories rather than concentrated on a few items or item categories. Such diversity in the number of items or item categories may indicate that the content of the associate website is not sufficiently focused on or related to one or more particular items. As a result, while the associate website may be effective at driving sales or visits to the host merchant website 102, the content of the associate website is unlikely to benefit the host merchant website 102 with marketing the one or more particular items.

In various embodiments, the machine learning algorithm may make use of supervised learning, unsupervised learning, semi-supervised learning, and such, to recognize a sales and/or visitation pattern that indicates a particular associate website is a demand aggregation website. The machine learning algorithm may make use of various classifiers. For example, various classification schemes (explicitly and/or implicitly trained) and/or systems (e.g., support vector machines, neural networks, expert systems, Bayesian belief networks, fuzzy logic, data fusion engine, and/or so forth) may be employed. Other directed and undirected model classification approaches include, e.g., naïve Bayes, Bayesian networks, decision trees, neural networks, fuzzy logic models, and probabilistic classification models providing different patterns of independence may also be employed.

Once the machine learning algorithm has determined that an associate website is a demand aggregation website, the associate selection module 208 may automatically exclude the associate website from being selected for data extraction. In additional embodiments, once such an associate website has been identified, the identity of associate website (e.g., URL, IP address, and/or assigned associate identifier) may be added to a list of demand aggregation websites that is stored in the data store 230. In this way, the associate selection module 208 may in further instances automatically exclude an associate website without relying on the machine learning algorithm. In certain embodiments, the associate selection module 208 may also provide a mechanism (e.g., change a setting on a configuration web page of the host merchant website) for each selected associate website to opt out of data extraction by the host merchant website 102.

The referral trace module 210 may parse the referrer tag, such as the referrer tag 128, of each selected associate website to obtain address information (e.g., URL or IP address) that leads back to the corresponding associate website. In some embodiments, the referral trace module 210 may extract the address information directly from a referrer tag. For example, the referrer tag 128 that is passed to the servers 104 of the host merchant website 102 may be embedded with a URL or an IP address of the associate website 106. As a result, the referral trace module 210 may extract the URL or the IP address directly from the referrer tag 128.

In other embodiments, the referral trace module 210 may extract a unique associate identifier from a referrer tag, such as the referrer tag 128. In such embodiments, the operator of the host merchant website 102 may have assigned a unique associate identifier to each of the associate websites 106(1)-106(N). Accordingly, once the referral trace module 210 has extracted a unique associate identifier of an associate website (e.g. an alphanumeric string value), the referral trace module 210 may look up the associate identifier in an associate lookup table stored on the servers 104 to ascertain the corresponding URL or IP address of the associate website.

In various embodiments, the referral trace module 210 may also determine the particular item that each referral link is linked to from the data in a corresponding referrer tag. For example, the referrer tag 128 may include a text string "XYZ television", indicating that the corresponding referral link is for the "XYX model television set" for sale on the host merchant website 102. In another example, the referrer tag 128 may include an alphanumeric text string "item=1001", and the referral trace module 210 may use an item look up table stored in the servers 104 to translate into "XYZ model television set".

The referral trace module 210 may further collect secondary referrer tags, such as the secondary referrer tag 138. Each secondary referrer tag may contain information related to how a consumer navigated to a particular associate website. Such information may include the URL of the website the consumer was referred from to an associate website and/or text data, such as search terms or key word terms that may also be beneficial to the host merchant website 102. The referral trace module 210 may associate such search terms or keywords with the relevant final destination web page on the host merchant website 102.

The data index module 212 may be a crawler that parses each associate website selected by the associate selection module 208 from the associate websites 106(1)-106(N) for index terms. In various embodiments, the data index module 212 may use the web address obtained by the referral trace module 210 to access one or more web pages of each associate website. Upon obtaining index terms from a web page of an associate website that contains a referral link to a particular item, the data index module 212 may further associate the obtained index terms with one or more web pages on the host merchant website 102 that is related to the particular item. For example, when the data index module 212 obtains the index terms from the web page 114 of the associate website 106(N), the data index module 212 may associate the index terms with the web page 122 that is on the host merchant website 102. The data index module 212 may associate the terms with the web page 122 by embedding the index terms obtained from the web page 114 as HTML data, XML data, and/or other forms of metadata in the web page 122.

In other embodiments, the data index module 212 may also extract terms directly from certain referrer tags, such as the secondary referrer tag 138, as index terms for one or more web pages. For example, the secondary referrer tag 138 may indicate that a consumer used the web search engine 126 to navigate to the web page 114, which eventually lead to the item 120 on the web page 122 of the host merchant website 102. As a result, any search terms found in the secondary referrer tag 138 may be indexed and associated with the web page 122.

The data aggregation module 214 may aggregate data from the multiple associate websites selected from associate websites 106(1)-106(N) by the associate selection module 208. The data aggregation module 214 may use the web address obtained by the referral trace module 210 to access one or more web pages of each associate website. In various embodiments, the data aggregation module 214 may gather data from web pages of the multiple associate websites that pertain to a particular item. For example, if the data aggregation module 214 is tasked with looking for web pages that contain frequently asked questions (FAQS) regarding an item 120, the data aggregation module 214 may look for data portions in each of the associate websites 106(1) and 106(N) that are FAQs if the websites 106(1) and 106(N) contain referral links to the item 120. In another example, the data aggregation module 214 may similarly look for product specification information for the item 120 in the web pages of associate websites. In an additional example, the data aggregation module 214 may further look for reviews of items in a product category (e.g., televisions) from the web pages of associate websites. The data aggregation module 214 may further aggregate the information that is gathered for centralized presentation, such as for presentation on a single web page at the host merchant website 102. In some embodiments, the data aggregation module 214 may use a machine learning algorithm, such as the algorithm described above with respect to the associate selection module 208, to recognize relevant data portions for extraction from the web pages.

The content extraction module 216 may extract content portions from each associate website selected by the associate selection module 208 from the associate websites 106(1)-106(N). The content extraction module 216 may use the web address obtained by the referral trace module 210 to access one or more web pages of each associate website. In various embodiments, the content extraction module 216 may extract a content portion (e.g., text snippets, paragraphs) on the web page of an associate website that may be attributed to causing a consumer to click on one or more referral links on the same web page. In various embodiments, the content extraction module 216 may make this determination based on the position of the content portion with respect to a referral link or the nature of the content portion. For example, the content extraction module 216 may extract a paragraph from the content 116 on the web page 114 for the item 120 when the referral link 118 is part of the paragraph. In another example, the content extraction module 216 may extract a review paragraph from the content 116 when the review paragraph contains many positive or superlative words that describe the item 120. In some embodiments, the context extraction module 216 may use a machine learning algorithm, such as the algorithm described above with respect to the associate selection module 208, to recognize relevant content portions for extraction from the web pages.

In further embodiments, each of the data index module 212, the data aggregation module 214, and the content extraction module 216 may further perform their respective data extraction techniques on each website that referred consumers to an associate website. For example, if the secondary referrer tag 138 indicates that a consumer was referred to the associate website 106(N) by a hyperlink on another informational website rather than the web search engine 126, each of the data index module 212, the data aggregation module 214, and the content extraction module 216 may navigate to the informational website to perform their respective data extraction on the informational website.

The dynamic edit module 218 may dynamically create or modify one or more web pages on the host merchant website 102, such as the web page 122, based on the data gathered by the data index module 212, the data aggregation module 214, and/or the content extraction module 216. In some embodiments, the dynamic edit module 218 may create a web page that aggregates content portions (e.g., reviews for televisions) as created by various content authors and extracted from multiple associate websites. In such embodiments, the dynamic edit module 218 may arrange the content portions from these associate websites in a descending order (e.g., top of a web page to the bottom of a web page) according to the number of sale conversions each associate website is able to generate through the content and referral links. Thus, a content portion from an associate website with a higher number of sale conversions may be placed higher on the web page than a content portion from an associate with a lower number of sale conversions. In such a scenario, being ranked higher on such a web page may serve as an inducement for content authors to produce more engaging and persuasive content that generates more sale conversions. Alternatively, the content portions may be arranged according to the ranking scores produced by the ranking distribution module 220, or based on the number of visits that each associate website generates for the host merchant website 102.

In other embodiments, the dynamic edit module 218 may update an item web page, such as the web page 122 for the item 120, with information obtained by the data aggregation module 214 or the content extraction module 216. In many cases, such information may supplement the existing information that the operator of the host merchant website 102 has already placed on a web page about a particular item. For example, the web page 122 may be updated with FAQs, opinions, commentaries, or additional product information related to the item 120 that were extracted from associate websites. Such supplemental information may serve to better inform consumers who are viewing the item on the web pages, influence consumer buying decisions by highlighting latest trends and innovations regarding the items on the web pages, or otherwise induce consumers to buy items from the host merchant website 102.

The dynamic edit module 218 may create or modify different web pages on the host merchant website 102 based on whether a predetermined amount of information has been gathered for an item or topic or on a time dependent basis. For example, the dynamic edit module 218 may create a web page that includes aggregated data regarding an item or a topic when data has been extracted from a sufficient number of associate web sites. In another example, the dynamic edit module may modify a web page with information gathered from associate web sites on a daily, weekly, or monthly basis.

In some scenarios, the created or modified web pages may be further indexed by web search engines, such as the web search engine 126, and/or an internal search of the web engine of the host merchant website 102. As such, these created or modified web pages on the host merchant website 102 may be returned in response to a consumer search query, when previously no web pages from the host merchant website 102 may have been returned for the same search query.

The ranking distribution module 220 may distribute ranking information to each of the associate websites selected for data extraction. The ranking distribution module 220 may calculate ranking scores for each of the associate websites in the same manner as the associate selection module 208. In some embodiments, the ranking distribution module 220 may also generate information related to each ranking score, such as the number of sale conversions on the host merchant website 102 per referral link, visits to the host merchant website 102 per referral link, increase or decrease in reputation score, and/or so forth.

The ranking distribution module 220 may then distribute each ranking score and/or related information to a corresponding associate website via different techniques. In certain embodiments, the ranking distribution module 220 may upload the ranking information to one or more secured web pages from which operators of the associate websites may retrieve their respective data following authentication. In other embodiments, the ranking distribution module 220 may distribute the ranking information to the operators of the associate website via email, fax, text message, voice message retrieval, and/or so forth. In this way, the ranking information may provide the operators of the associate websites with valuable feedback regarding the effectiveness of their content in producing sale conversions and visitation traffic at the host merchant website 102. For example, the operator of the associate website 106(N) may determine from the ranking information that a recent version of the content 116 of the web page 114 actually resulted in a decrease in the number of sale conversions on the host merchant website 102. As a result, the operator may choose to revert back to a previous version of the content 116.

The referral distribution module 222 may select item referral links for presentation on noncommittal associate web sites that elect to display referral links selected by the operator of the host merchant website 102. In other words, rather than investing the time and the energy to select and place referral links to specific items available on the host merchant website 102, the operators of such noncommittal associate websites may have elected to let the host merchant website 102 determine the referral links to be placed on their associate websites. In such a scenario, the referral distribution module 222 may use the data index module 212 to periodically crawl the content of these noncommittal associate websites. Further, by matching the index terms discovered on these noncommittal associate websites to index terms associated with items for sale on the host merchant website 102, the referral distribution module 222 may determine the referral links that are to be presented on these noncommittal associate websites. In some embodiments, at least one index term from the noncommittal associate website may be considered to match one or more index terms associated with an item for sale on the host merchant when a degree of similarity between the at least one index term from the noncommittal associate website and the one or more index terms associated with the item exceeds a predefined similarity threshold. For example, a noncommittal associate website may contain content related to trail biking, but operator of the associate website may be unsure of what sort of referral links to display. In such an example, the referral distribution module 222 may populate the associate website with referral links to the two most popular mountain bikes for sale on the host merchant website 102.

The incentive module 224 may manage monetary incentives to be provided to the operators of associate websites in exchange for extracted data. The incentive module 224 may disburse a predetermined amount of monetary incentive for each content portion that is imported verbatim from an associate website and used by the host merchant website 102. The incentive module 224 may also disburse a predetermined amount of monetary incentive to each associate website in exchange content indexing by the data index module 212. In some embodiments, the incentive module 224 may also vary the amount of monetary incentive and/or commission for each sale conversion or generated visit based on the ranking score of each associate website. For example, an operator of an associate website that produced a higher number of sale conversions may receive more monetary incentive for the content extracted from the associate website. In contrast, an operator of an associate website that produced a lower number of sale conversions may receive less monetary incentive for the content extracted from the associate website. Such a variable compensation scheme may further motivate operators of the associate websites to produce content that drive up sale conversions or visitation traffic at the host merchant website 102.

The user interface module 226 may enable a user to interact with the various modules of the data propagation engine 130 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The user interface module 226 may enable the operator of the host merchant website 102 to adjust the weight factors used by the associate selection module 208. The user interface module 226 may also enable the operator to view the data extracted by the data index module 212, the data aggregation module 214, and/or the content extraction module 216. The user interface module 226 may further enable the operator to adjust the amount of incentives disbursed.

The commerce applications 228 may include applications that facilitated functions associated with e-commerce. For example, the commerce application may include an application that provides the site search engine for searching the content of the host merchant website 102, an application that provides product recommendations, an application that processes product orders, an application that calculates payments, an application that detects fraud, an application that processes shipments, and the like.

The data store 230 may store data that is used and produced by the modules of the data propagation engine 130. In various embodiments, data store 230 may store lookup tables that are used by the referral trace module 210. The data store 230 may also store data that is extracted by the data index module 212, the data aggregation module 214, and/or the content extraction module 216. The data store 230 may further store the ranking scores for the associate websites that are calculated by the associate selection module 20 and the ranking distribution module 220, the incentives calculated by the inventive module 224, as well as other relevant data.

Figure 3:
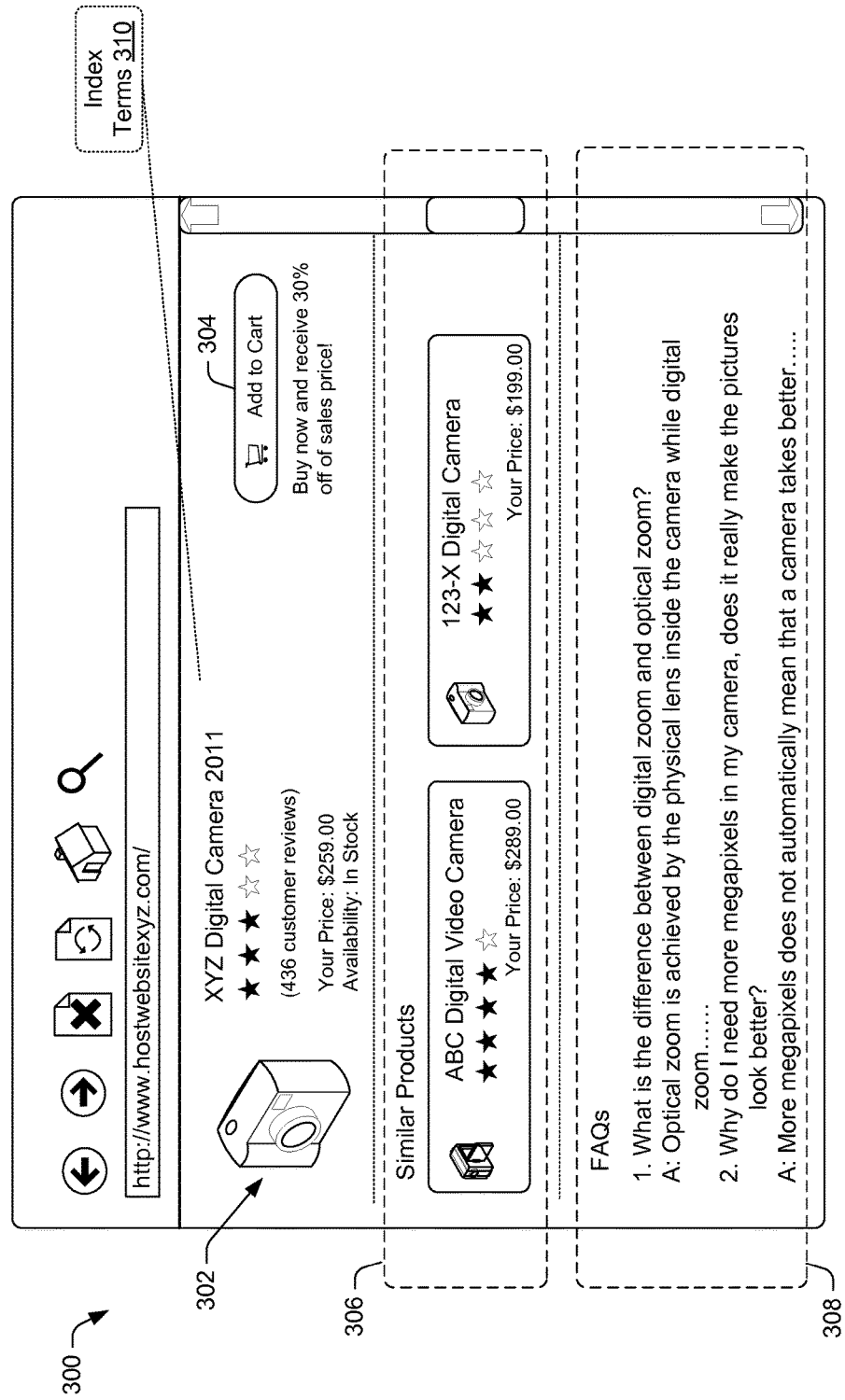
FIG. 3 shows an illustrative item web page on a host merchant website that incorporates information extracted from associate websites by the data propagation engine.

FIG. 3 shows an illustrative item web page 300 on a host merchant website that incorporates information extracted from associate websites by the data propagation engine. The web page 300 may present an item 302 that is available for sale at the host merchant website 102. The web page 300 may include a purchase button 304 that a consumer may use to purchase the item 302, as well as a description of the item 302 as generated by the operator of the host merchant website 102. For example, the description may include a presentation 306 of items that are similar to the item 302 available for sale at the host merchant website.

The web page 300 may further include a content portion 308 that is extracted from one or more associate websites by the data aggregation module 214 or the content extraction module 216. For example, the content portion 308 may be a FAQ section that is extracted from a selected associate website that contains a referral link to the item 302. Alternatively, the content portion 308 may be a FAQ section that includes questions and answers aggregated from multiple associate websites that provide referral links to the item 302. The web page 300 may be associated with index terms 310. The index terms 310 may be extracted from web pages of one or more associate websites by the data index module 212. For example, the index terms 310 may be embedded as metadata in the web page 300.

Figure 4:
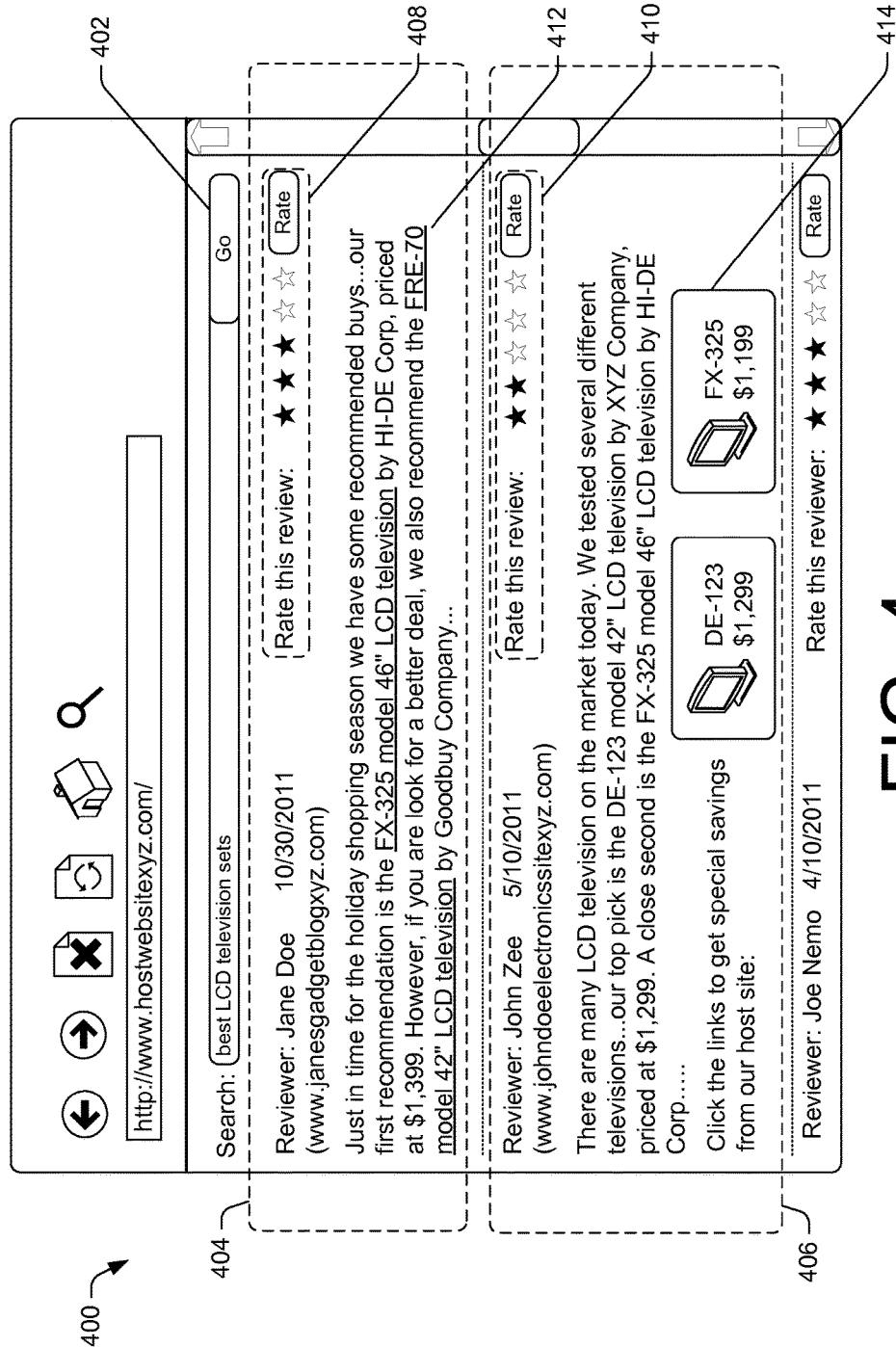
FIG. 4 shows an illustrative web page on a host merchant website that includes aggregated content extracted from multiple associate websites by the data propagation engine.

FIG. 4 shown an illustrative web page on a host merchant website that includes aggregated content extracted from multiple associate websites by the data propagation engine. The web page 400 may include a search query field 402 that receives a search query from a consumer. For example, the consumer may type in the name of a particular product he/she wishes to purchase, a descriptive phrase, or a sentence in the form of a question. Accordingly, when a consumer types in the phrase "best LCD television set" into the search query field 402, the web page 400 may display content that is extracted from multiple associate websites by data aggregation module 214 and/or the content extraction module 216. In various embodiments, the content may include a content portion 404 and a content portion 406 (e.g., product reviews), among other content portions. The content portion 404 may be placed in a more prominent location, i.e., higher location, on the web page 400 than the content portion 404. This position order may be due to the fact that the associate website that provided the content portion 404 generated more sale conversions for the host merchant website 102 than the associate website that provided the content portion 406. The content portions 404 and 406 may be placed in the web page 400 using frames and/or other similar techniques.

Alternatively, the placement of the content portions 404 and 406 may be due to the fact that the associate website of the content portion 404 generates more visits to the host merchant website than the associate website of the content portion 406 or a difference in ranking scores of the respective websites.

In some embodiments, each of the content portions may include respective rating interfaces. For example, the content portion 404 may be provided with a rating interface 408, and the content portion 406 may be provided with a rating interface 410. Each of the rating interfaces may display the current reputation rating of the corresponding associate website, as well as enable consumers to submit their changes to the reputation rating. For example, consumers viewing the web page 400 may modify a star rating (or some other equivalent rating) and then submit the modification by clicking a rate button. In this way, the reputation rating submitted by the consumers for each content portion may be averaged and used in the calculation of the ranking score of the corresponding associate website.

Moreover, since the content portion 404 is placed higher than the content portion 406 in the web page 400, the associate website that provided the content portion 404 may receive a higher commission for each sale conversion or visit generation resulting from its referral links (e.g., referral link 412). Conversely, since the content portion 406 is placed lower than the content portion 404, the associate website that provided the content portion 406 may receive a lower commission for each sale conversion or visit generation resulting from its referral links (e.g., referral link 414). In this way, each associate website may have an incentive to produce content that provides the most benefit to the host merchant website 102.

Illustrative Operations

FIGS. 5-9 show illustrative processes 500-900 that implement techniques extracting content from associate websites. Each of the processes 500-900 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and so forth that perform particular functions or implement particular abstract data types. The order in which the operations are described is not intended to be construed as a limitation, and any number of the described blocks can be combined in any order and/or in parallel to implement the process. For discussion purposes, the processes 500-900 are described with reference to the computing environment 100 of FIG. 1.

Figure 5:
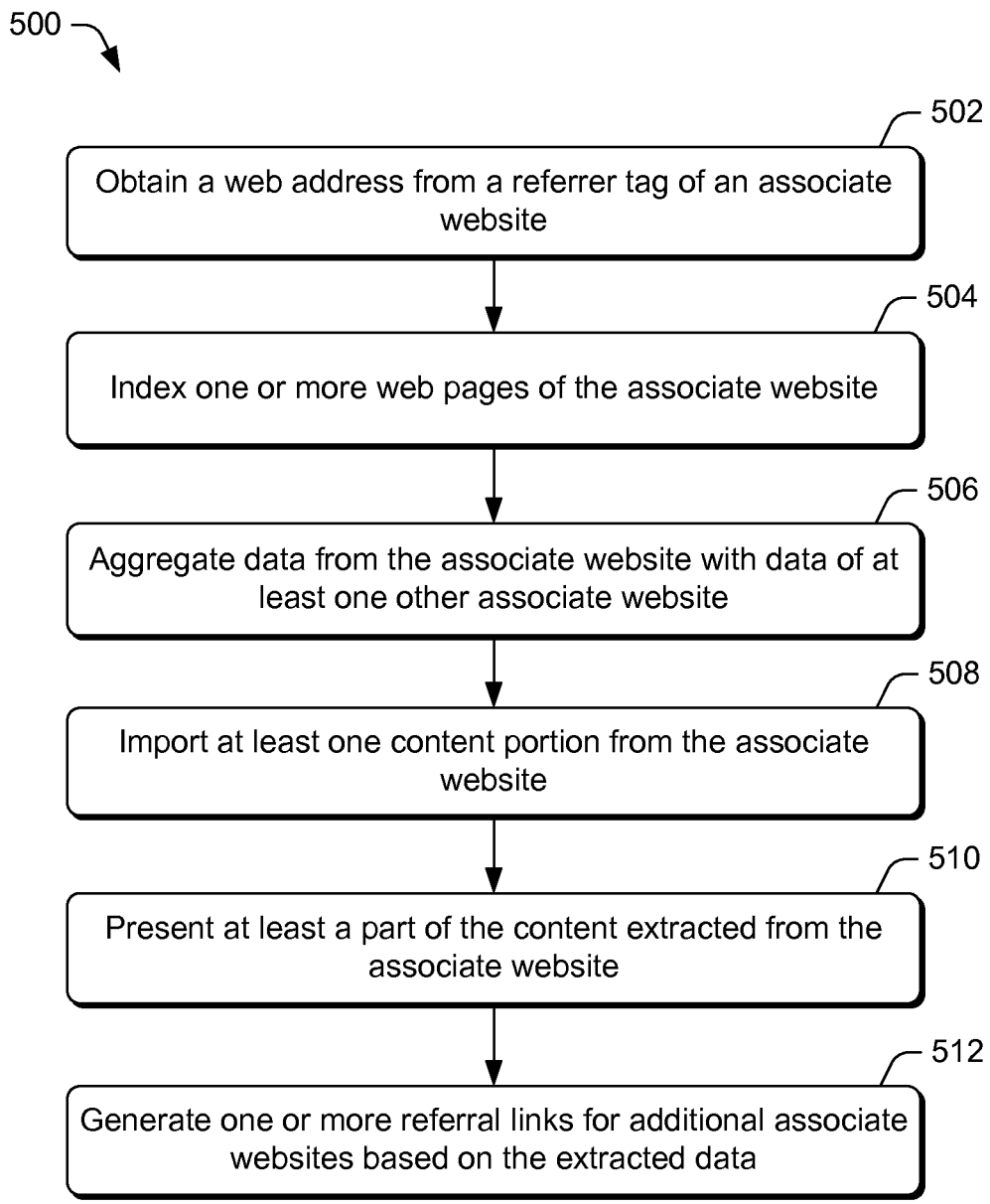
FIG. 5 is a flow diagram of an illustrative process for extracting different types of information from an associate website of a host merchant website.

FIG. 5 is a flow diagram of an illustrative process 500 for extracting different types of information from an associate website of a host merchant website. At block 502, the referral trace module 210 may obtain a web address of a referring web page that includes a referring link to a particular item. In various embodiments, the web address of the referring web page may be obtained by parsing the web address from a referrer tag of the referring link or correlating an identifier parsed from the referrer tag with a web address using a lookup table. The associate website may be selected by the associate selection module 208 based on its ranking score, number/rate of sale conversions, visits generated, and/or other factors.

At block 504, the data index module 212 may index one or more web pages of the associate website. The data index module 212 may navigate to the associate website using the obtained web address. The data index module 212 may crawl the one or more web pages for index terms. Upon obtaining index terms from the one or more web pages that contain the referral link to a particular item, the data index module 212 may further associate the obtained index terms within one or more web pages on the host merchant website 102 that is related to the particular item.

At block 506, the data aggregation module 214 may aggregate data from the associate website with data of at least one other associate website. The data aggregation module 214 may navigate to the associate website using the web address obtained by the referral trace module 210. The aggregated data may be content that is related to a particular item that is commonly described by or commonly linked to by web pages of the associated website and the at least one other associate website.

At block 508, the content extraction module 216 may import at least one content portion from the associate website. The content extraction module 216 may navigate to the associate website using the obtained web address. In various embodiments, the content portion extracted from one or more web pages of the associate website may be content that is determined to be influential in causing consumers to visit or make purchases on the host merchant website 102. In other embodiments, the at least one content portion extracted by the content extraction module 216 may be related to a particular item or a particular topic. Each of the content portions may include a content snippet (e.g., a phrase or a clause) that is extracted or a verbatim content section (e.g., a paragraph) that is imported from the associate website.

At block 510, the dynamic edit module 218 may present at least a part of the content extracted from the associate website on the host merchant website 102. In some embodiments, the presented content may include one or more content snippets and/or one or more verbatim content sections. In other embodiments, the presented content may be aggregated data that include a content portion from the associate website and/or information (e.g., text snippets, paragraphs) extracted from the associate website.

At block 512, the referral distribution module 222 may generate one or more referral links for display on additional associate websites based on the data extracted from the associate website. The additional associate websites may be noncommittal associate websites that are unsure of what sort of referral links to present. Accordingly, the referral distribution module 222 may use the data index module 212 to periodically crawl the content of these noncommittal associate websites. Further, by matching the index terms discovered on these noncommittal associate websites to index terms associated with items for sale on the host merchant website 102, the referral distribution module 222 may determine the referral links that are to be presented on these noncommittal associate websites. It will be appreciated that in the example process 500, each of the web page indexing, the content aggregation, and the content extraction, as respectively described in blocks 504, 506, and 508, may be performed independently or collectively in any combination.

Figure 6:
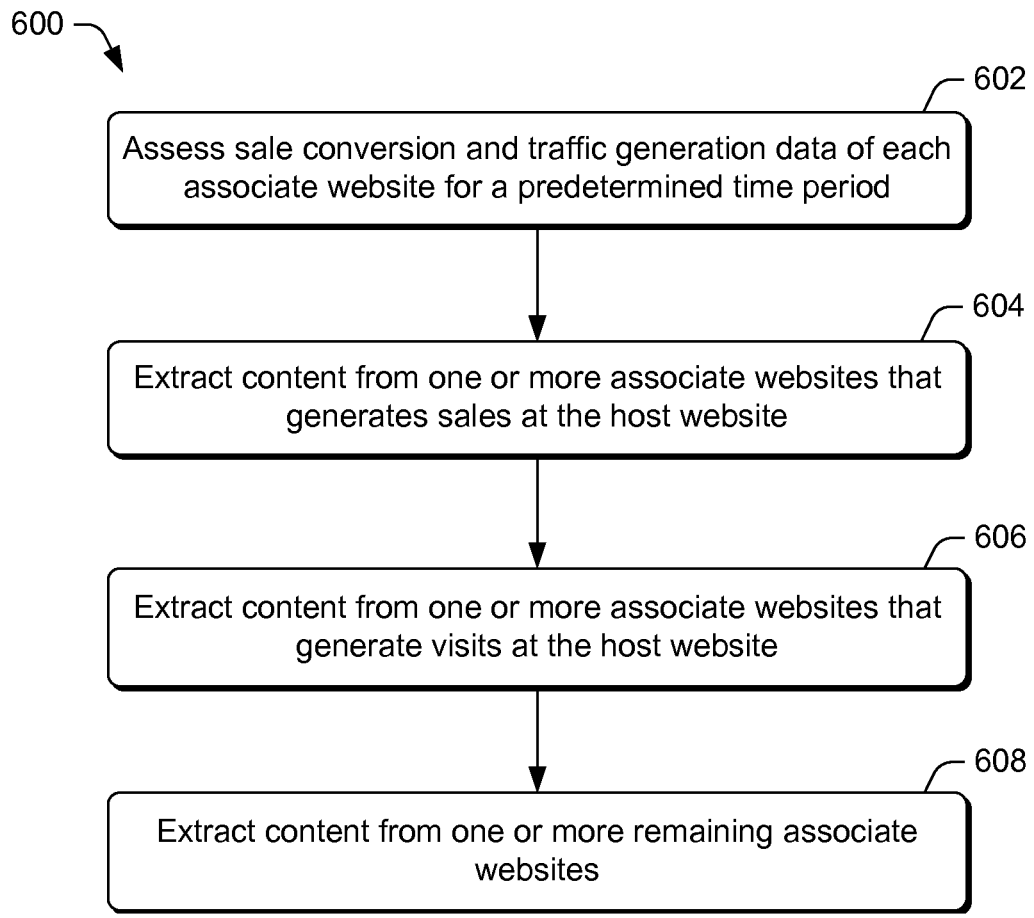
FIG. 6 is a flow diagram of an illustrative process for selecting associate websites for content extraction based on a benefit of each associate website to the host merchant website.

FIG. 6 is a flow diagram of an illustrative process 600 for selecting associate websites for content extraction based on a benefit of each associate website to the host merchant website. The content extraction described in the process 600 may be performed by one or more of the data index module 212, the data aggregation module 214, and the content extraction module 216 of the data propagation engine 130.

At block 602, the associate selection module 208 may assess sale conversion and traffic generation data for each associate website of a host merchant website 102 for a predetermined time period. The sale conversion data may indicate the number of sale conversions that each associate website generated for the host merchant website 102 in the predetermined time period. Likewise, the traffic generation data may indicate the number of visits to the host merchant website 102 that each associate website generated in the predetermined time period.

At block 604, the data propagation engine 130 may extract content from one or more associate websites that generate sales at the host merchant website 102. In some embodiments, the priority in the extraction of content from such associate websites may be based on the number of generated sales each associate website produced, proceeding from an associate website with the highest number of generated sales to an associate website with the lowest number of generated sales.

At block 606, the data propagation engine 130 may extract content from one more associate websites that generate visitation traffic to the host merchant website 102. In some embodiments, the priority in the extraction of content from such associate websites may be based on the number of visits each associate website produced, proceeding from an associate website with the highest number of generated visits to an associate website with the lowest number of generated visits.

At block 608, the data propagation engine 130 may extract content from one or more of the remaining associate website that are affiliated with the host merchant website 102. In some embodiments, the extraction of content from such associate websites may be performed in a random manner to ensure that content is extracted from a diverse cross section of the remaining associate websites.

In various embodiments, the illustrative process 600 may terminate early without proceeding through all of the blocks if it is determined that a sufficient amount of data has been extracted. For example, sufficient data may be deemed extracted when data has been extracted from a predetermined number of associated websites, when a sufficient number of content portions related to an item or topic are imported, or when a sufficient number of content portions related to an item or topic are aggregated.

Figure 7:
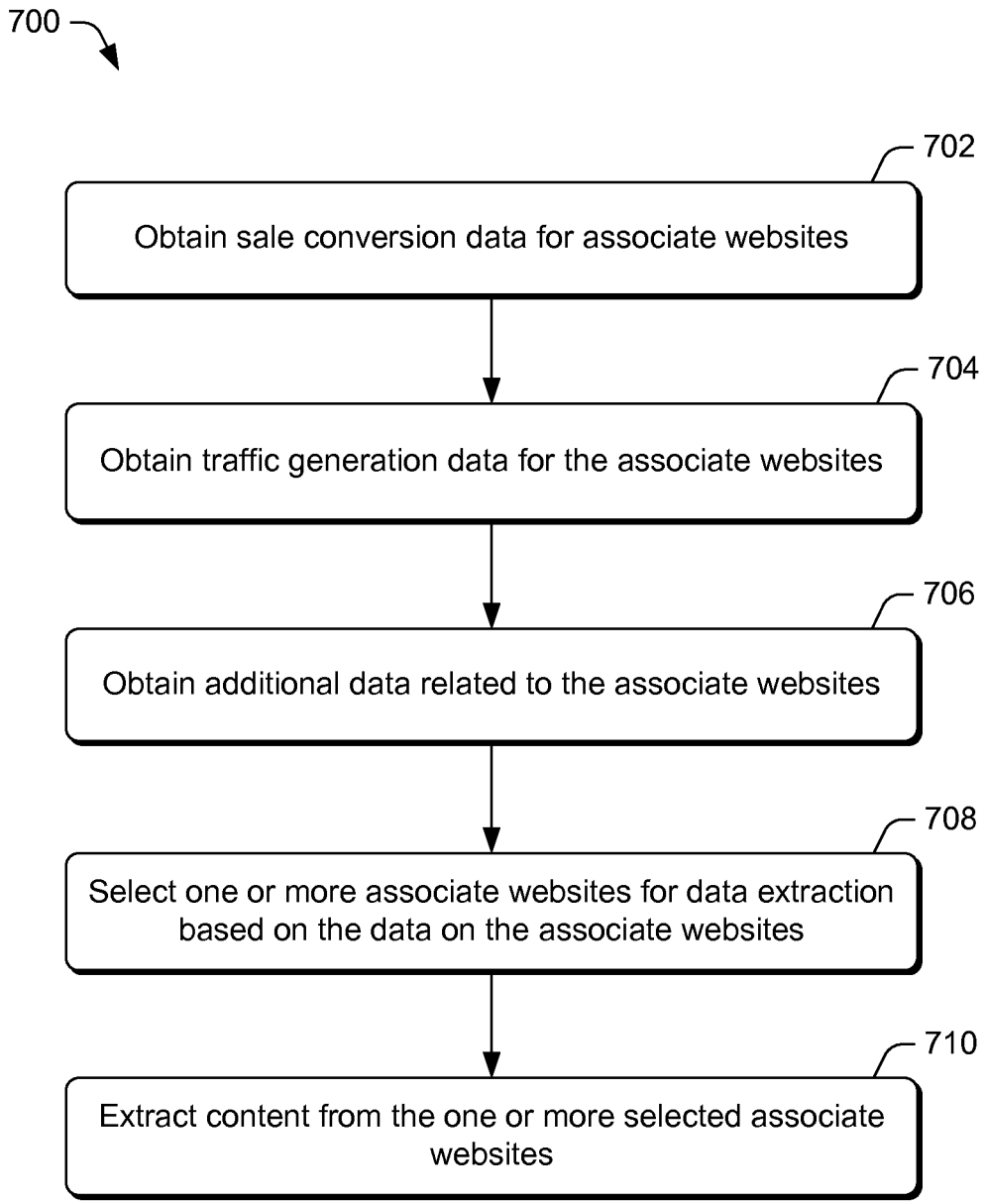
FIG. 7 is a flow diagram of an illustrative process for selecting associate websites for content extraction based on characteristics of each associate website.

FIG. 7 is a flow diagram of an illustrative process 700 for selecting associate websites for content extraction based on characteristics of each associate website. At block 702, the associate selection module 208 may obtain sale conversion data for multiple associate websites. The sale conversion data may indicate the number of sale conversions that each associate website generated for the host merchant website 102 in a predetermined time period.

At block 704, the associate selection module 208 of the data propagation engine 130 may obtain traffic generation data for multiple associate websites. The traffic generation data may indicate the number of visits to the host merchant website 102 that each associate website generated in the predetermined time period.

At block 706, the associate selection module 208 may obtain additional data related to the associate websites. The additional data may include the reputation ratings of the associate websites. For example, the reputation of an associate website may depend on its ability to provide accurate and up-to-date data related to various products, unbiased and truthful opinions, and/or commentary that reflect actual experience or first account information. The additional data may also include other metrics that quantify the effectiveness of each associate website in generating sales for the host merchant website 102, such as the sale conversion rate and/or the total sales value of each associate website for a predetermined period of time.

At block 708, the associate selection module 208 may select one or more associate websites for data extraction based on the obtained data on the associate websites. In various embodiments, the associate selection module 208 may take into account all the data by deriving a total ranking score for each associate website based on the data. Based on the ranking scores, the associate selection module 208 may select at least some of the associate websites for data extraction. In other embodiments, the associate selection module 208 may select an associate website for data extraction based on its ranking score exceeding a threshold score, or when another value that quantifies the effectiveness of the associate website in generating sales for the host merchant website 102 exceeds a corresponding benchmark value. In some embodiments, the associate selection module 208 may also use a machine learning algorithm to identify one or more demand aggregation websites so that they are excluded from selection.

At block 710, the data propagation engine 130 may use the data index module 212, the data aggregation module 214, and/or the content extraction module to extract content from the selected associate websites.

Figure 8:
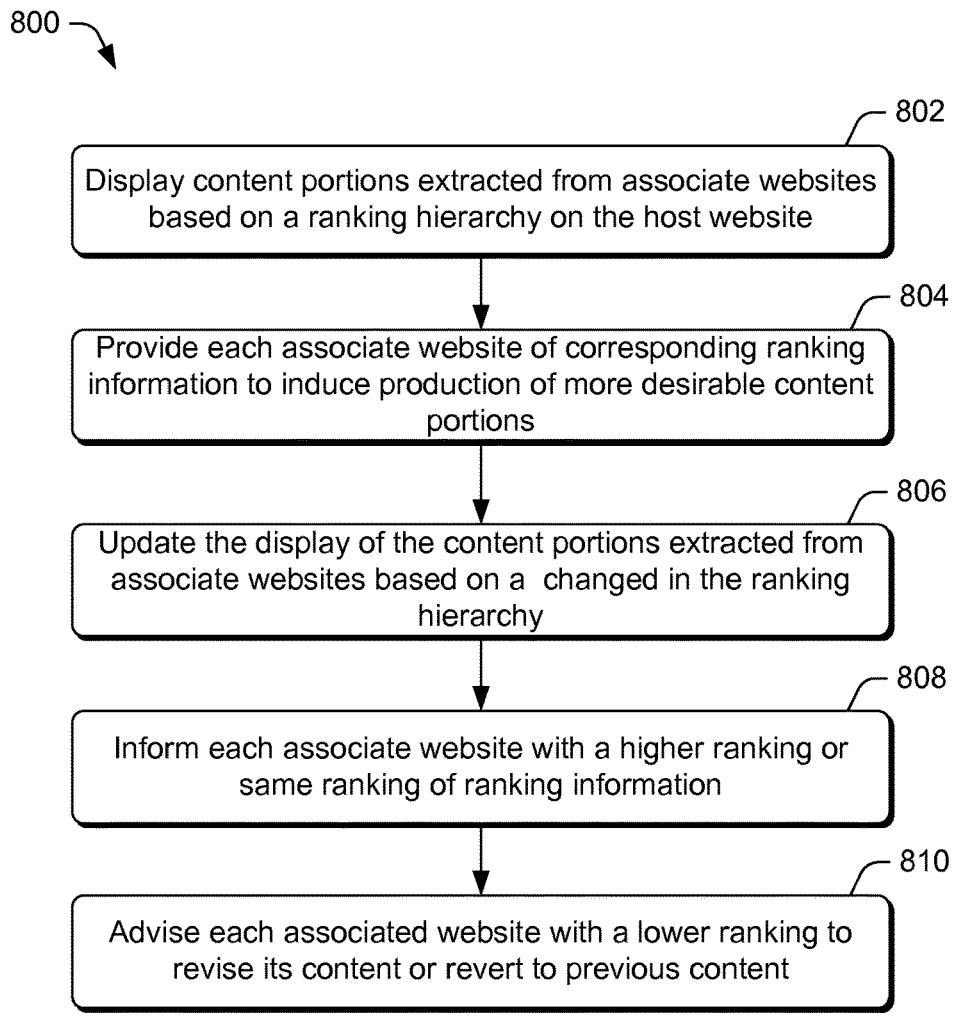
FIG. 8 is a flow diagram of an illustrative process for displaying content portions extracted from associate websites to induce production of more beneficial content portions by the associate websites.

FIG. 8 is a flow diagram of an illustrative process 800 for displaying content portions extracted from associate websites to induce production of more beneficial content portions by the associate websites.

At block 802, the dynamic edit module 218 may create a web page for the host merchant website 102 that displays content portions extracted from multiple associate websites based on a ranking hierarchy. In various embodiments, the content portions may be extracted from the multiple associate websites by the data aggregation module 214 or the content extraction module 216 of the data propagation engine 130. For example, various reviews for a particular item for sale on the host merchant website 102 may be extracted by the data propagation engine 130 from the associate websites.

In some embodiments, the dynamic edit module 218 may arrange the content portions from the associate websites in a descending order (e.g., top of a web page to the bottom of the web page) according to the number sale conversions each associate website is able to generate through the content and referral links on each associate website for a predetermined time period. In other embodiments, the ranking hierarchy may be based on the ranking scores produced by the ranking distribution module 220 for the predetermined time period, or based on the number of visits that each associate website generates for the host merchant website 102 for the predetermined time period, in which a higher score provides higher ranking hierarchy. In still other embodiments, the ranking hierarchy may be based on any one of the metrics used by the associate selection module 208.

At block 804, the ranking distribution module 220 may distribute corresponding ranking information to each of the associate websites from which content was extracted. The ranking distribution module 220 may calculate ranking scores for each of the associate websites in the same manner as the associate selection module 208. In some embodiments, the ranking distribution module 220 may also generate information related to each ranking score, such as the number of sale conversions on the host merchant website 102 per referral link, visits to the host merchant website 102 per referral link, increase or decrease in reputation score, and/or so forth. Thus, the distributed ranking information and the desire to be ranked higher may serve as an inducement for authors of the associate websites to produce more engaging and persuasive content that produces more sale conversions.

At block 806, the dynamic edit module 218 may update the display of the content portions extracted from the associate websites based on a change in the ranking hierarchy. The change in ranking hierarchy may be based on the number of sale conversions or visits that each associate website is able to generate in a new predetermined time period, or the ranking score of each associate website in the new predetermined time period.

In some embodiments, the updated display of the content portions may also include the display of one or more revised content portions extracted from the associate websites. The revised content portions may be extracted from one or more of the multiple associate websites by the data aggregation module 214 or the content extraction module 216 of the data propagation engine 130. The content portions may be extracted from the associate websites after a predetermined amount of time has passed since the last content extraction.

At block 808, the ranking distribution module 220 may distribute corresponding ranking information to each of the associate websites with a higher ranking or the same ranking in the new predetermined time period. In addition to the ranking score, the corresponding ranking information may further include information such as the number of sale conversions on the host merchant website 102 per referral link, visits to the host merchant website 102 per referral link, increase or decrease in reputation score, and/or so forth.

At block 810, the ranking distribution module 220 may advise each associate website with a lower ranking in the new predetermined time period to revise the corresponding content or revert to pervious content. The ranking distribution module 220 may distribute the advice with related ranking information. In various embodiments, the related ranking information includes the ranking score, visits to the host merchant website 102 per referral link, increase or decrease in reputation score, and/or so forth.

Figure 9:
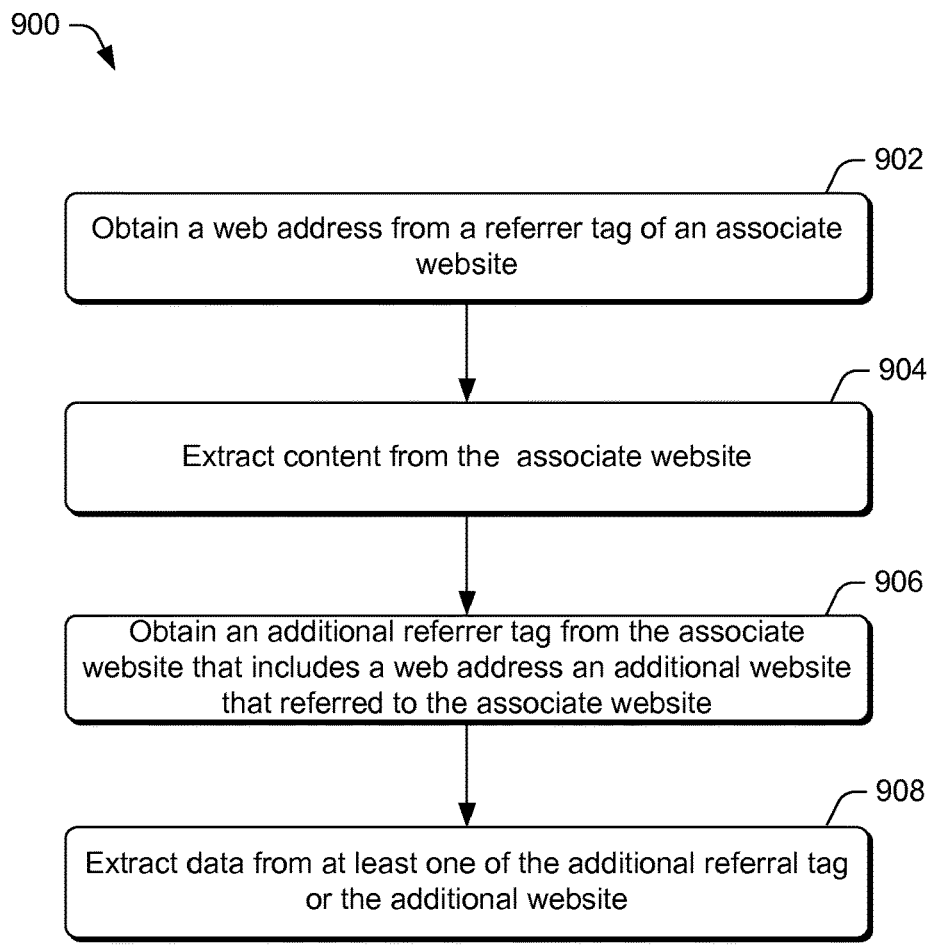
FIG. 9 is a flow diagram of an illustrative process for extract content from an additional website that referred a consumer to an associate website.

FIG. 9 is a flow diagram of an illustrative process 900 for extract content from an additional website that referred a consumer to an associate website. At block 902, the referral trace module 210 may obtain a web address of a referring web page that includes a referring link to a particular item. In various embodiments, the web address of the referring web page may be obtained by parsing the web address from a referrer tag of the referring link or correlating an identifier parsed from the referrer tag with a web address using a lookup table. The associate website may be selected by the associate selection module 208 based on its ranking score, number/rate of sale conversions, visits generated, and/or other factors.

At block 904, the data propagation engine 130 may extract content from the associate website via the data index module 212, the data aggregation module 214, and/or the content extraction module 216. The extract content may include index terms and/or content portions that are associated with one or more particular items for sale on the host merchant website 102.

At block 906, the referral trace module 210 may obtain an additional referrer tag, such as the secondary referrer tag 138, from the associate website. The additional referrer tag may include a web address of an additional website and information related to how a consumer navigated to the associate website. For example, the additional referrer tag may include a web address that indicates the additional website is a search engine website and a consumer used one or more particular search terms to locate the associate website. In another example, the web address in the referrer tag may indicate that the additional website linked directly to the associate website.

At block 908, the data propagation engine 130 may extract content from at least one of the additional referrer tag or the additional website via the referral trace module 210, the data index module 212, the data aggregation module 214, and/or the content extraction module 216. The extract content may include search terms, index terms, and/or content portions that are associated with one or more particular items for sale on the host merchant website 102.

In summary, the techniques for extracting content from associate website in accordance with the various embodiment described above may enable an operator of the host merchant website to gain insight into web content that are particularly effective at driving consumer purchases of different items. Further, the use of such web content may provide the operator of the host merchant website with a marketing edge over competitors with similar merchant websites.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic device comprising:
a processor; and non-transitory memory storing components executable by the processor, the components comprising:
an associate selection component that selects a first associate website from a plurality of associate websites for content extraction, the first associate website including a referral link to an item for sale on a host website, wherein a commission is provided to an entity corresponding to the first associate website in response to at least one of: a consumer navigating to the host website using the referral link, or the consumer making a purchase of the item using the referral link;
a referral trace component that:
acquires a unique associate identifier of the first associate website from a first referrer tag received from the first associate website;
ascertains a web address of the first associate website using the unique associate identifier; and
collects a second referrer tag from the first associate website, wherein the second referrer tag comprises search data related to a navigation to the first associate website by the consumer;
a data index component that locates the first associate website using the web address, extracts one or more search terms from the second referrer tag, and associates the one or more search terms with the item for sale on the host website;
a referral distribution component that modifies an additional associate website to include a second referral link to the item based at least in part on a determination that a similarity between at least one search term of the additional associate website and the one or more search terms meets or exceeds a predefined similarity threshold;
a content extraction component that locates the first associate website using the web address, and that imports, from the first associate website, a content portion verbatim that is related to the item;
an incentive component to provide compensation to the entity corresponding to the first associate website in exchange at least for importation of the content portion verbatim from the first associate website into the host website;
a data aggregation component that locates the first associate website using the web address, and that generates aggregated data by aggregating data from the first associate website that is related to the item with other data that is related to the item from at least one second associate website of the plurality of associate websites; and
a dynamic edit component that presents at least one of the content portion, index data or the aggregated data on a web page of the host website.

2. The electronic device of claim 1, wherein the associate selection component generates a ranking score for the first associate website based at least in part on a plurality of metrics, and selects the first associate website for content extraction when the ranking score of the first associate website is among a predetermined quantity of highest ranking scores of the plurality of associate websites, the plurality of metrics including at least one of: a number of sale conversions generated for the host website by the first associate website, a number of visits generated for the host website by the first associate web site, or a reputation rating of the first associate website.

3. The electronic device of claim 2, further comprising a ranking distribution component that performs at least one of:
sending the ranking score to an operator of the first associate website when the ranking score is equal to or more than a previous ranking score; or
advising the operator of the first associate website to revise the first associate website when the ranking score is less than the previous ranking score.

4. A computer-implemented method comprising:
selecting, by one or more computing systems, an associate website from a plurality of associate websites for content extraction, the associate website including a referral link to an item offered on a host website, wherein a commission is provided to an entity corresponding to the associate website in response to at least one of: a consumer navigating to the host website using the referral link, or the consumer making a purchase of the item using the referral link, wherein the selecting includes selecting the associate website for the content extraction based at least in part on a metric of the associate website in generating sales for the host website exceeding a benchmark value;

acquiring, by the one or more of the computing systems, a unique associate identifier of the associate website from a referrer tag extracted from the associate website;

verifying, by the one or more of the computing systems, a web address of the associate website using the unique associate identifier;

obtaining, by the one or more of the computing systems, content from one or more web pages of the associate website, the obtaining including importing a content portion from the associate website;

generated aggregated data by aggregating data from the associate website that is related to the item with other data that is related to the item from at least one second associate website of the plurality of associate websites;

extracting, by the one or more of the computing systems, an index term from the associate website and embedding the index term in the host website;

associating, by the one or more of the computing systems, at least a part of the content with the item offered on the host website; and presenting at least one of a portion of the content obtained from the associate website, index data associated with the index term, or the aggregated data on a web page of the host website.

5. The computer-implemented method of claim 4, further comprising presenting at least another part of the content obtained from the associate website on the web page of the host website that lists the item.

6. The computer-implemented method of claim 4, further comprising:
detecting that an additional associate website of the plurality of associate websites is a demand aggregation website using a machine learning algorithm; and
excluding the additional associate website from being selected for content extraction.

7. The computer-implemented method of claim 4, wherein the selecting includes selecting the associate website further based in part on the associate website being among a predetermined quantity of the plurality of associate web sites that generate a highest number of visits to the host website.

8. The computer-implemented method of claim 4, wherein the selecting includes:
acquiring a plurality of metrics for the associate website, the plurality of metrics including a number of sale conversions generated for the host website by the associate website, a number of visits generated for the host website by the associate website, a reputation rating of the associate website, a sale conversion rate of the associate website, and a total sales value generated by the associate website;
generating a ranking score for the associate website based at least in part on one or more metrics from the plurality of metrics; and
selecting the associate website for the content extraction when the ranking score of the associate website is among a predetermined quantity of highest ranking scores generated for the plurality of associate websites or when the ranking score of the associate website is greater than a threshold score.

9. The computer-implemented method of claim 4, wherein the selecting further includes selecting the associate website based in part on the associate website being among a predetermined quantity of the plurality of associate websites that generate at least a threshold number of item purchases for the host website.

10. The computer-implemented method of claim 8, further comprising weighting each of the plurality of metrics by a corresponding weighting factor.

11. The computer-implemented method of claim 4, wherein the obtaining includes navigating to the associate website using the web address.

12. The computer-implemented method of claim 11, further comprising:
obtaining an additional referrer tag from the associate web site that includes search data related to referral to the associate website; and
extracting the search data from the additional referral tag.

13. The computer-implemented method of claim 4, wherein the obtaining further includes extracting one or more index terms from at least one web page of the associate website.

14. The computer-implemented method of claim 13, wherein the associating further includes embedding the one or more index terms in the web page of the host website that lists the item.

15. The computer-implemented method of claim 14, further comprising placing a referral link to the item on an additional associate website when a similarity between at least one index term of the additional associate website and the one or more index terms exceeds a predefined similarity threshold.

16. The computer-implemented method of claim 4, further comprising providing compensation in exchange for at least importing the content portion verbatim from the associate website.

17. A non-transitory computer readable media storing computer-executable instructions that, when executed, cause one or more processors to perform acts comprising:
selecting at least one associate website from a plurality of associate websites of a host website for content extraction, each associate website including referral links to one or more items offered on the host website and content related to each of the one or more items, wherein a commission is provided to an entity corresponding to the associate website in response to at least one of: a consumer navigating to the host website using a first referral link, or the consumer making a purchase of an item using the first referral link;
acquiring a unique associate identifier of an associate website from a first referrer tag extracted from the associate website;
acquiring a second referrer tag from the associate website, wherein the second referrer tag comprises data related to a navigation to the associate website by the consumer;
obtaining content related to each of the one or more items offered on the host website from the at least one associate website;
extracting one or more index terms from the second referrer tag extracted from the associate website and associating, as metadata, the one or more index terms with an item;
aggregating data from the associate website with other data from at least one other associate website to generate aggregated data;

presenting at least one of a part of the content related to each of the one or more items, index data associated with the one or more index terms, or the aggregated data on a corresponding web page on the host website; and causing an additional associate website to include a second referral link to the item when a similarity between at least one index term of the additional associate website and the one or more index terms exceeds a predefined similarity threshold.

18. The non-transitory computer readable media of claim 17, wherein the selecting includes:

acquiring a plurality of metrics for the associate website, the plurality of metrics including a number of sale conversions generated for the host website by the associate website, a number of visits generated for the host website by the associate website, and a reputation rating of the associate web site;

generating a ranking score for the associate website based at least in part on one or more metrics from the plurality of metrics; and selecting the associate website for content extraction when the ranking score of the associate website is among a predetermined quantity of highest ranking scores of associate websites or when the ranking score of the associate website is greater than a threshold score.

19. The non-transitory computer readable media of claim 17, wherein the obtaining further includes importing a content portion verbatim from the associate website that is related to the item.

20. The non-transitory computer readable media of claim 17, wherein the presenting includes:

displaying content portions related to an item as obtained from multiple associate websites of the plurality of associate websites on a web page of the host website in accordance with a ranking hierarchy of the multiple associate websites; and updating the displaying of the content portions based at least in part on a change in the ranking hierarchy of the multiple associate websites, further comprising instructions that when executed, cause the one or more processors to perform an act comprising advising at least one associate website with a lower ranking in the ranking hierarchy following the updating to revise a corresponding content portion or revert to a previous content portion.

21. The non-transitory computer readable media of claim 20, further comprising instructions that when executed, cause the one or more processors to perform an act comprising informing at least one associate website with a higher or identical ranking in the ranking hierarchy following the change in the ranking hierarchy.

22. The non-transitory computer readable media of claim 21, wherein the updating includes replacing a content portion with a revised content portion.

23. The non-transitory computer readable media of claim 21, wherein the ranking hierarchy is organized based at least in part on sale conversions produced by each of the multiple associate websites, visits generated by each of the multiple associate websites, or ranking scores of each of the multiple associate websites.

24. The non-transitory computer readable media of claim 20, further comprising instructions that when executed, cause the one or more processors to perform an act comprising varying an amount of monetary incentive or an amount of monetary commission provided to entities corresponding to respective ones of the multiple associate websites based at least in part on the ranking hierarchy, each monetary incentive provided for extracted content and each monetary commission provided in exchange for at least one of a sale conversion or a visit generated for the host web site.

25. An electronic device, comprising:

a processor; and non-transitory memory storing components executable by the processor, the components comprising:

an associate selection component that selects an associate website from a plurality of associate websites for content extraction, the associate website including a first referral link to an item offered on a host website;

a referral trace component that acquires a unique associate identifier of the associate website from a first referrer tag received from the associate website and collects a second referrer tag from the associate website, wherein the second referrer tag comprises data related to a search referral to the associate website;

a data index component that extracts one or more index terms from at least one web page of the associate website and embeds at least one of the one or more index terms on the host website;

a referral distribution component that modifies an additional associate website to include a second referral link to the item when a similarity between at least one index term of the additional associate website and the one or more index terms exceeds a predefined similarity threshold;

a content extraction component that imports a content portion verbatim from the associate website;

a data aggregation component that aggregates data from the associate website with data from at least one other associate website to generate aggregated data; and a dynamic edit component that presents at least one of the content portion, index data associated with the one or more index terms, or the aggregated data on a web page on the host website.

26. The electronic device of claim 25, wherein the referral trace component further ascertains a web address from the first referrer tag received from the associate website, wherein each of the data index component, the content extraction component, and the data aggregation component locates the associate website using the web address, and wherein the data index component further extracts a search term from the second referrer tag and embeds the search term in the host website.

27. The electronic device of claim 25, wherein the associate selection component generates a ranking score for the associate website based at least in part on a plurality of metrics that includes a number of sale conversions generated for the host web site by the associate web site, a number of visits generated for the host web site by the associate website, and a reputation rating of the associate website, and that selects the associate website for content extraction when the ranking score of the associate website is among a predetermined quantity of highest ranking scores generated for the plurality of associate websites or when the ranking score of the associate website is greater than a threshold score.

28. The electronic device of claim 25, further comprising at least one of:

an incentive component to provide compensation in exchange at least for importation of the content portion verbatim from the associate web site; and a ranking distribution component that sends a ranking score of the associate web site to the associate website.

29. The electronic device of claim 27, wherein the dynamic edit component arranges the at least one of the content portion, the one or more index terms, or the aggregated data on the web page on the host website according to the number of sale conversions each associate website is able to generate through the content and referral links.

\* \* \* \* \*